(12) United States Patent
Davenport et al.

(10) Patent No.: US 11,563,721 B2
(45) Date of Patent: Jan. 24, 2023

(54) METHODS AND SYSTEMS FOR NETWORK ADDRESS TRANSLATION (NAT) TRAVERSAL USING A MEET-IN-THE-MIDDLE PROXY

(71) Applicant: HEWLETT PACKARD ENTERPRISE DEVELOPMENT LP, Houston, TX (US)

(72) Inventors: Christopher Davenport, Houston, TX (US); Kenneth Leach, Houston, TX (US); Jorge Daniel Cisneros, Houston, TX (US); Ivan Farkas, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 225 days.

(21) Appl. No.: 16/907,279

(22) Filed: Jun. 21, 2020

(65) Prior Publication Data
US 2021/0400022 A1 Dec. 23, 2021

(51) Int. Cl.
*H04L 29/06* (2006.01)
*H04L 9/40* (2022.01)
*H04L 61/2567* (2022.01)

(52) U.S. Cl.
CPC ...... *H04L 63/0281* (2013.01); *H04L 61/2567* (2013.01); *H04L 63/0236* (2013.01)

(58) Field of Classification Search
CPC ............. H04L 63/0281; H04L 61/2567; H04L 63/0236
See application file for complete search history.

(56) References Cited

U.S. PATENT DOCUMENTS

| | | | | |
|---|---|---|---|---|
| 6,345,300 | B1* | 2/2002 | Bakshi | H04L 63/029 709/219 |
| 8,230,484 | B1* | 7/2012 | Wiese | H04L 63/104 726/28 |
| 9,100,369 | B1* | 8/2015 | Fallows | H04L 63/029 |
| 2001/0056550 | A1* | 12/2001 | Lee | H04L 63/0838 713/153 |
| 2003/0172264 | A1* | 9/2003 | Dillon | H04L 63/1466 713/160 |
| 2004/0044909 | A1* | 3/2004 | Mirza | H04L 63/0281 726/27 |
| 2013/0179570 | A1* | 7/2013 | Goldburg | G06F 9/541 709/225 |

(Continued)

*Primary Examiner* — Joseph P Hirl
*Assistant Examiner* — Ka Shan Choy
(74) *Attorney, Agent, or Firm* — Mauriel Kapouytian; Woods LLP

(57) ABSTRACT

Systems and methods for bypassing firewalls using a server management protocol is provided. In various embodiments, a proxy component serves as a "man-in-the-middle" between an edge client and a server client. The proxy component can receive a server connection request from the edge client to connect to a requested server client using a managed network name associated with the server client. The proxy component can establish a proxy connection with the requested server client, and routing data packets between the server client and the edge client. The edge client and the server client are connected without the public advertisement of the private addresses of the edge client and the server client.

19 Claims, 7 Drawing Sheets

(56) References Cited

U.S. PATENT DOCUMENTS

2013/0283377 A1* 10/2013 Das ..................... H04W 12/128
 726/23
2021/0036991 A1* 2/2021 Owens ................ H04L 63/0236
2021/0392079 A1* 12/2021 Slovetskiy .......... H04L 61/2525

* cited by examiner

METHODS AND SYSTEMS FOR NETWORK ADDRESS TRANSLATION (NAT) TRAVERSAL USING A MEET-IN-THE-MIDDLE PROXY

DESCRIPTION OF RELATED ART

Network address translation (NAT) is a method of remapping an IP address space into another address space by modifying the network address information in the IP header of packets while in transit. Firewalls, routers, gateways, and other networking devices can be configured to implement NAT. By translating the IP addresses before the packets are sent from the NAT-enabled network to another public and/or private network the NAT protocol hides the actual IP addresses of the individual network devices within the NAT-enabled network.

In order for devices outside of the NAT-enabled network to communicate directly with a network device of the NAT-enabled network the devices would need to know or acquire the true IP address of the device of the NAT-enabled network. NAT traversal is a technique of establishing and maintaining a connection across the firewall or other gateway network device configured to implement the NAT protocol. Several types of NAT traversal methods exist, including socket secure (SOCKS), traversal using relays around NAT (TURN), session traversal utilities for NAT (STUN), virtual private networks (VPNs), among others.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
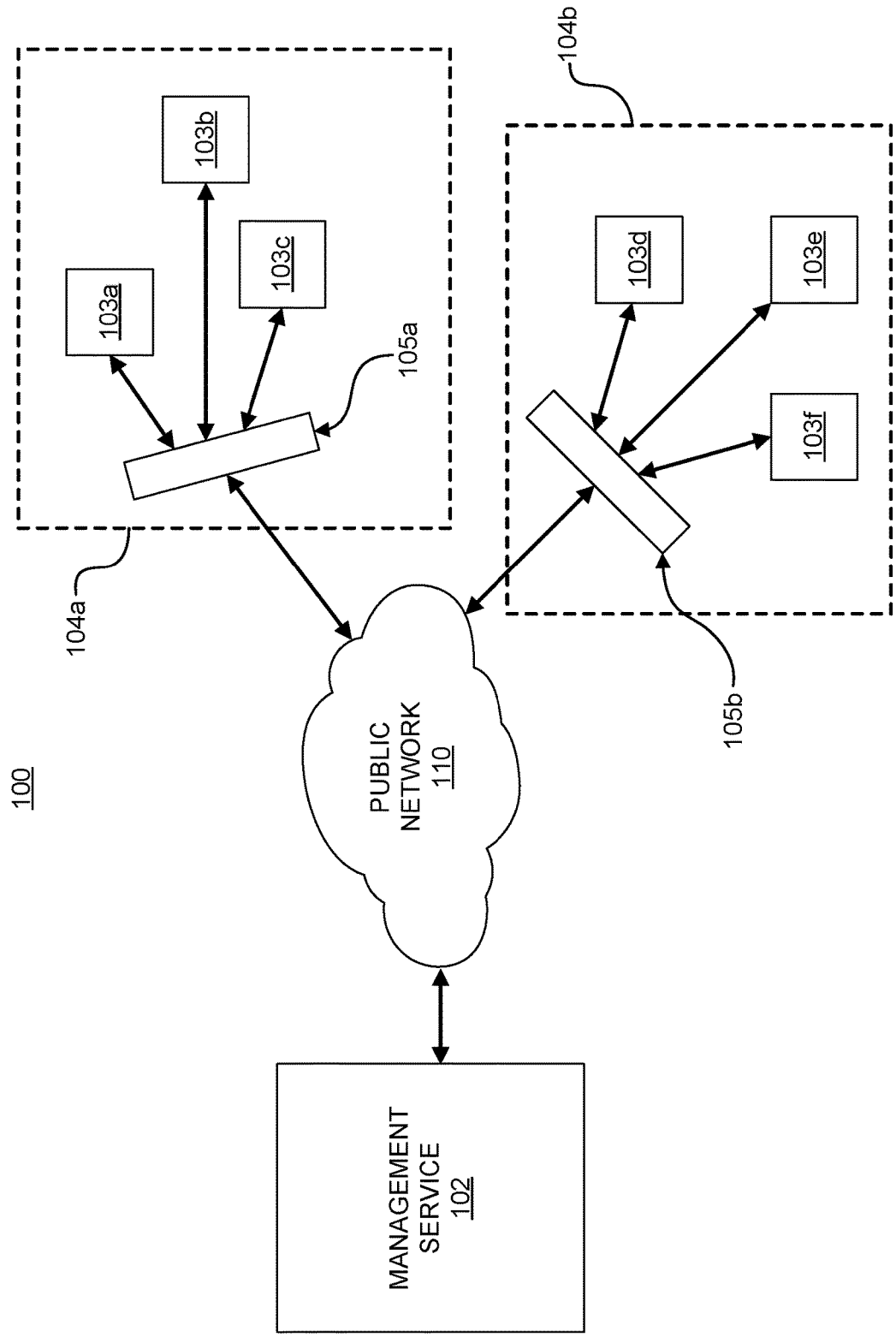
FIG. 1 illustrates an example managed network in accordance with embodiments of the technology disclosed herein.

The figures are not exhaustive and do not limit the present disclosure to the precise form disclosed.

DETAILED DESCRIPTION

NAT devices, such as NAT firewalls, allow the use of private IP addresses on private networks while using a single public IP address to be used when connecting to a public network (e.g., the Internet). The NAT devices change the source address of outgoing requests to the public-facing IP address of the NAT device. When an external device or network sends a reply back, the reply is addressed using the public-facing IP address of the NAT device, which is configured to route the reply to the originating device (i.e., the client). In this manner, communication is enabled to outside networks without exposing the private, assigned IP address of each network device behind the NAT device.

Although general network traffic is not negatively impacted by the NAT protocol, certain applications such as peer-to-peer file sharing, voice over IP (VoIP) services, gaming networks, among others, can require the clients to include servers as well. Moreover, when a request to connect to a client is received from outside of the NAT-protected network it is difficult to identify the proper client to which the received data should be routed. Current NAT traversal approaches enable clients to publish their path using the public-facing IP address, enabling outside clients to establish direct communication (e.g., peer-to-peer connections), thereby bypassing the NAT protocol.

Generally, current NAT traversal approaches requires this type of public exposure of identifying information for the clients sitting behind the NAT device on the NAT-enabled network. As an example, the STUN protocol requires that clients (internal and external to the NAT-enabled network) are each capable of communicating with a STUN server. When seeking to establish a connection, the NAT-protected client can send a request to the STUN server, which will respond with the public-facing IP address and port information of the associated NAT device. This information is now accessible through the STUN server, which can be used by the clients to establish a connection bypassing the NAT protocol. The STUN server provides an available public source for addressing information for NAT-protected clients. Similarly, other NAT traversal approaches require that the public addressing information for a NAT-protected client to be publicly published.

Moreover, use of current NAT traversal protocols are proprietary, requiring that all the connecting clients need to be compatible with the respective NAT traversal protocol being used. Accordingly, implementing NAT traversal protocols within a managed network infrastructure, such as networks including edge devices, requires that the firmware and hardware are configured to implement one or more NAT traversal protocols. This increases the overhead on the clients within the network, increasing the space required and the complexity of integration. Further, multiple current NAT traversal approaches may need to be implemented within a given network in order to enable NAT traversal. As an example, in addition to the STUN protocol, such an implementation may further require TURN and/or interactive connectivity establishment (ICE) protocols may also need to be included within the clients.

Embodiments of the present disclosure provide methods and systems for enabling NAT traversal without the need to publicly advertise a client's address path in order to allow a direct connection bypassing the NAT protocol. A "meet-in-the-middle" proxy component is utilized to provide a known service location to which an edge client running on a customer device behind a NAT firewall can connect. The proxy component can route data packets received and/or requests for data packets from the edge client to a server client running on a server device (i.e., the server to which the edge client seeks to communicate). Utilizing the secure communication connection between the edge client and the proxy component, data packets to and from the server client can be transmitted through the NAT firewall without publicly advertising the addressing information for either the edge client or the server client. In various embodiments, the NAT firewall can be configured such that clients sitting behind the NAT firewall can only establish outgoing connection, without allowing connections to be established over incoming requests. This NAT traversal can be implemented using a server management protocol traditionally included in client-server networks like those discussed herein.

FIG. 1 illustrates an example managed network 100 in which embodiments of the technology disclosed herein can be implemented. The example managed network 100 is provided for illustrative purposes only and should not be interpreted as limiting the scope of the technology disclosed herein. As shown in FIG. 1, the managed network 100 includes a management service 102, public network 110, firewalls 105a, 105b (generally, "the firewall 105," collectively, "the firewalls 105"), and a plurality of edge devices 103a-f (generally, "the edge device 103," collectively, "the edge devices 103"). In various embodiments one or more additional elements can be included within the managed network 100 without limiting the applicability of the technology disclosed herein.

The management service 102 can provide management services to a plurality of network devices operating within the managed network 100, including but not limited to edge devices 103. In various embodiments, the management service 102 can be disposed within a data center comprising a plurality of server devices, routers, switches, and other network devices. The management service 102 serves as the backend for the management and control of the edge devices 103 within the managed network 100. In various embodiments, each server device can be configured to monitor, control, or otherwise manage one or more edge service networks 104a, 104b (generally, "the edge service network 104," collectively, "the edge service networks 104") associated with a customer utilizing the management service 102. As a non-limiting example, a server of the management service 102 can be configured to provision edge devices 103 operating within each edge service network 104 associated with a respective customer.

Each edge service network 104 can be associated with a separate customer, or can comprise two different branches associated with the same customer. Within each edge service network 104, the firewall 105 serves as the public-facing gateway connecting the edge service network 104 to the public network 110. In various embodiments, the public network 110 can comprise the Internet. Although referred to as a "firewall" for ease of discussion, the firewalls 105 can comprise one or more of a NAT firewall device, a NAT-enabled router, a network gateway device, an access point, or other network *nexus* enabling the edge devices 103 of an edge service network 104 to access the public network 110 (i.e., access an external network from the edge service network 104). Although only two edge service networks 104 are illustrated in FIG. 1, a plurality of edge service networks 104 can be included within various embodiments of the managed network 100 without limiting the applicability of the technology disclosed herein. The public network 110 provides a connection medium over which each of the edge service networks 104 can connect with the management service 102 location.

Each firewall 105 can be configured such that connections with each of the edge devices 103 sitting behind the respective firewall 105 can only be established outward from the edge service network 104. That is, each edge device 103 can be allowed to establish a connection with an external device, but an external device is not allowed to establish a connection with an edge device 103. The firewall 105 isolates the edge devices 103 of the edge service network 104, enabling a private IP address space to be associated with each edge service network 104. In various embodiments, the firewall 105 can implement a NAT protocol to change the address information within packet headers received from an edge device (e.g., the private IP address of the edge device 103) so that the sender is identified as the firewall 105. In this way, the external device to which the edge device 103 is connecting only knows the IP address of the firewall 105. By prohibiting external devices to establish connections to edge devices 103 within an edge service network 104 the integrity of the edge service network 104 (and its associated edge devices 103) can be maintained.

As discussed above, the NAT firewall makes it difficult to establish direct connections between an edge device and an external device absent a NAT traversal protocol. Current traversal methods require a public advertisement of the private IP address of the edge devices 103. Implementing the technology disclosed herein allows for NAT traversal without the need for public advertisement of address information and without the need for complex traversal protocols to be included for clients of edge devices 103 and server devices of the management service 102.

Figure 2:
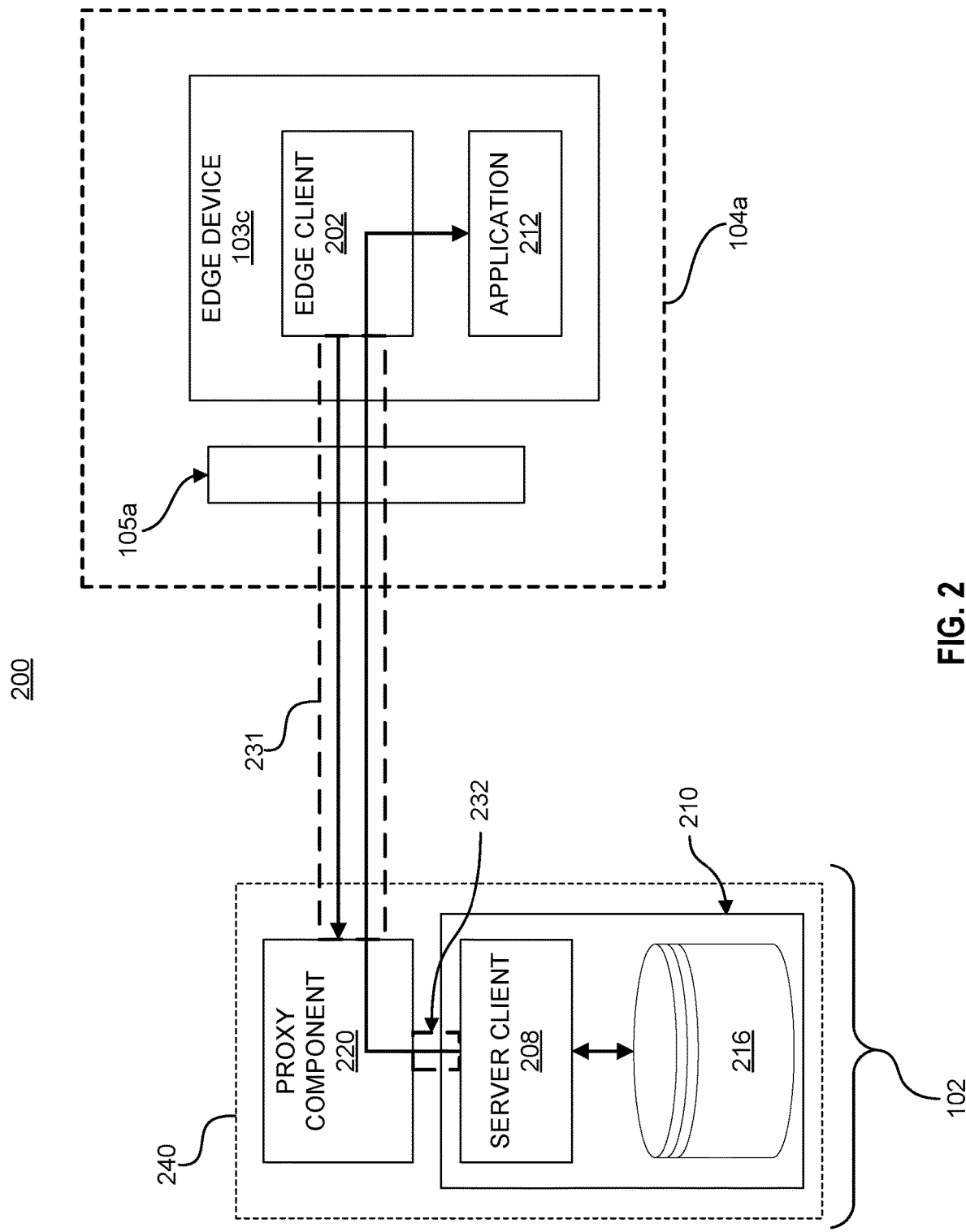
FIG. 2 is a block diagram illustrating an example edge device connection in accordance with embodiments of the technology disclosed herein.

FIG. 2 is a block diagram illustrating an example edge device connection 200 in accordance with embodiments of the technology of the present disclosure. The example edge device connection 200 is provided for illustrative purposes only and should not be interpreted as limiting the scope of the technology to only the depicted embodiment. For ease of discussion, FIG. 2 shall be discussed with respect to a NAT traversal connection between the management service 102 and an edge device 103c of the example managed network 100 of FIG. 1. Where references are common between the figures, it should be interpreted that the discussion of such references with respect to any figure is applicable unless otherwise expressly stated. Although discussed with respect to a single edge device 103c, the discussion is applicable to all edge devices 103.

Referring to FIG. 2, the edge device 103c sits behind the firewall 105a within the edge service network 104a. In various embodiments, the edge device 103c can comprise a network device connected to the edge service network 104a at a customer's location. As a non-limiting example, the edge service network 104a can comprise a branch of a customer's internal network configuration, and the edge device 103c can comprise a server, desktop, computer station, point of sale (PoS) system, or other network device. The edge device 103c can be connected to the firewall 105a over a wired and/or wireless connection. As a non-limiting example, the edge device 103c can be connected to the firewall 105a over a physical Ethernet cable from a port of the edge device 103c to a port of the firewall 105a, while in other embodiments the edge device 103c can be connected to the firewall 105a over a WiFi connection.

In various embodiments, the edge client 202 can comprise a program running on the edge device 103c and configured to enable direct connections with a server of the management service 102. The edge client 202 can be embodied as a set of non-transitory machine-readable instructions executable by a processor or other processing circuitry of the edge device 103c. In various embodiments, the edge client 202 is communicatively coupled to one or more applications 212 running on the edge device 103c. In some embodiments, the application 212 can comprise a network configuration application providing management functionality for the edge device 103c. Management functionality can comprise provisioning the edge device 103c to operate within the edge service network 104a properly with the other edge devices (not shown in FIG. 2) of the edge service network 104a.

To bypass the firewall 105 and the NAT protocol, the edge client 202 running on the edge device 103c transmits a server connection request to a proxy component 204. Generally, an edge client (like the edge client 202) must utilize a NAT traversal protocol to bypass the firewall 105, which requires that the edge device on which the client is running (like the edge device 103c) publicly advertise its private IP address. Moreover, these protocols usually rely upon third party servers accessible publicly, resulting in the private IP address of the edge device being known to a server outside the control of the management service (like the management service 102). Although some current NAT traversal protocols provide some protection against unintended uses, the address is still publicly accessible outside of the managed network. To avoid public disclosure of the private IP address, the technology disclosed herein utilizes unique private names to enable the edge devices to connect to a proxy component of the management service (like the proxy component 220), which serves as a "man-in-the-middle" outside of the firewall to enable traversal without the added complexity of the current NAT traversal protocols.

Referring to FIG. 2, the edge client 202 can establish a secure communication connection 231 with the proxy component 220 utilizing unique device identifiers. Current traversal protocols require the edge client 202 to obtain its public-facing IP address. However, the technology of the present disclosure assigns a unique name to the edge client 202 and the proxy component 220, enabling the edge client 202 to establish a direct connection to the proxy component 220 without the need for a specific NAT traversal protocol to be included. In various embodiments, the secure communication connection 231 can be a transport layer security (TLS) connection. In various embodiments, the secure communication connection 231 can be established using any secure communication approach known in the art. The secure communication connection 231 is established by the edge client 202 (i.e., is an outgoing connection), thereby maintaining the one-way connection establishment functionality of the firewall 105a. This maintains the integrity of the NAT-enabled edge service network 104a.

In some embodiments, the edge client 202 can send a request to establish the secure communication connection 231 to the proxy component 220, with the request addressed to the proxy component 220 utilizing the unique managed network name assigned to the proxy component 220. The edge client 202 can be configured with knowledge of the unique managed network name assigned to the proxy component 220. In some embodiments, the unique managed network name can be maintained within a non-transitory machine-readable storage media (not shown in FIG. 2) of the edge service network 104a. In various embodiments, the storage media can be a memory component of the edge device 103c while in some embodiments the storage media can be a shared memory resource of the edge service network 104a. In some embodiments, the one or more applications 212 can be configured with knowledge of the unique managed network name assigned to the proxy component 220, and can provide this information to the edge client 202 when seeking to establish a connection to the proxy component 220. In some embodiments, the edge client 202 can identify the managed network name assigned to the proxy component 220 during an initial activation of the edge client 202 on the edge device 103c. When an edge device is added to the edge service network 104a, a predefined activation process for the edge client 202 to communicate with at least one server 210 of the management service 102 can be performed. During this predefined activation process, the edge client 202 and/or the applications 212 can be provided with knowledge of the managed network name for one or more proxy components 220.

In various embodiments, the management service 102 comprises the proxy component 220 and the one or more servers 210. As shown in FIG. 2, the proxy component 220 and at least one server 210 can be co-located within a data center 240. In various embodiments, the proxy component 220 can comprise a physical network device, including but not limited to a server, router, or gateway, connected to the server 210 over a physical, server-facing port of the proxy component 220. In some embodiments, the proxy component 220 can comprise a virtual network device running on the same server 210 or a different server within the data center 240, connected to the server 210 over a virtual, server-facing port of the proxy component 220. In various embodiments, the proxy component 220 is connected to the server 210 over a single server-facing port. In some embodiments, the proxy component 220 can include a plurality of server-facing ports, each server-facing port corresponding to a server 210 of the plurality of servers 210 of the management service 102.

After the edge client 202 establishes a secure communication connection 231 with the proxy component 220, a proxy connection 232 can be established between the proxy component 220 and the server client 208 of the server 210. In various embodiments, the proxy component 220 can indicate to the server client 208 that the edge client 202 of the edge device 103c is seeking to establish a connection to the server 210, and the server client 208 can establish the proxy connection 232. In other embodiments, in response to the edge client 202 establishing the secure communication connection 231, the proxy component 220 can establish the proxy connection 232 with the server client 208. The proxy connection 232 can be established between the proxy port of the server 210 and the server-facing port of the proxy component 220 associated with the respective server 210. In various embodiments, the proxy connection 232 can be a persistent connection between the server 210 and the proxy component 220. In other embodiments, the proxy connection 232 can be established between the server client 208 and the proxy component 220 when necessary to facilitate communication (i.e., send and/or receive data packets) or to reconnect to the proxy component 220 if a disconnect occurs.

The server 210 can comprise a server client 208 and server resources 216 in various embodiments. Each server of the management service 102 is configured to provide resources to the edge devices 103 of the edge service networks 104 within the managed network 100. In various embodiments, the server resources 216 can include, but are not limited to, data stored on a non-transitory machine-readable storage medium accessible by the server 210, computing resources to perform one or more requested actions, configuration data for provisioning the edge devices 103, control operations data, system status monitoring data, binary data, among other types of requested data. The server client 208 transmits one or more data packets to the proxy component 220 over the proxy connection 232. In some embodiments, the server client 208 is capable of transmitting data packets in response to a request from the edge client 202, and in some embodiments the server client 208 is capable of transmitting data packets requesting the edge client 202 to provide a response (e.g., process one or more data packets from the server client 208 and return a response based on the processing) and/or control data.

After the establishment of the proxy connection 232, the server client 208 can send an edge connection request to the proxy component 220. The edge connection request from the server client 208 can identify the edge device 103c to which a connection is to be made. In various embodiments, identifying the edge device 103c can utilize the unique managed network name assigned to the edge device 103c. Based on the identified edge device 103c, the proxy component 220 can be configured to route the data packets from the server client 208 to the edge-facing port of the proxy component 220 over which the edge client 202 of the intended edge device 103c is connected using the secure communication connection 231. In response to receiving the edge connection request from the server client 208, the proxy component 220 can send a proxy acknowledgment to the server client 208 in various embodiments. The proxy acknowledgement sent to the server client 208 can provide an indication that the proxy component 220 has successfully set the routing path such that the server client 208 can communicate with the edge client 202 directly. That is, the proxy component 220 is configured to route data received over the server-facing port of the proxy connection 232 to the edge-facing port of the secure communication connection 231.

Figure 4:
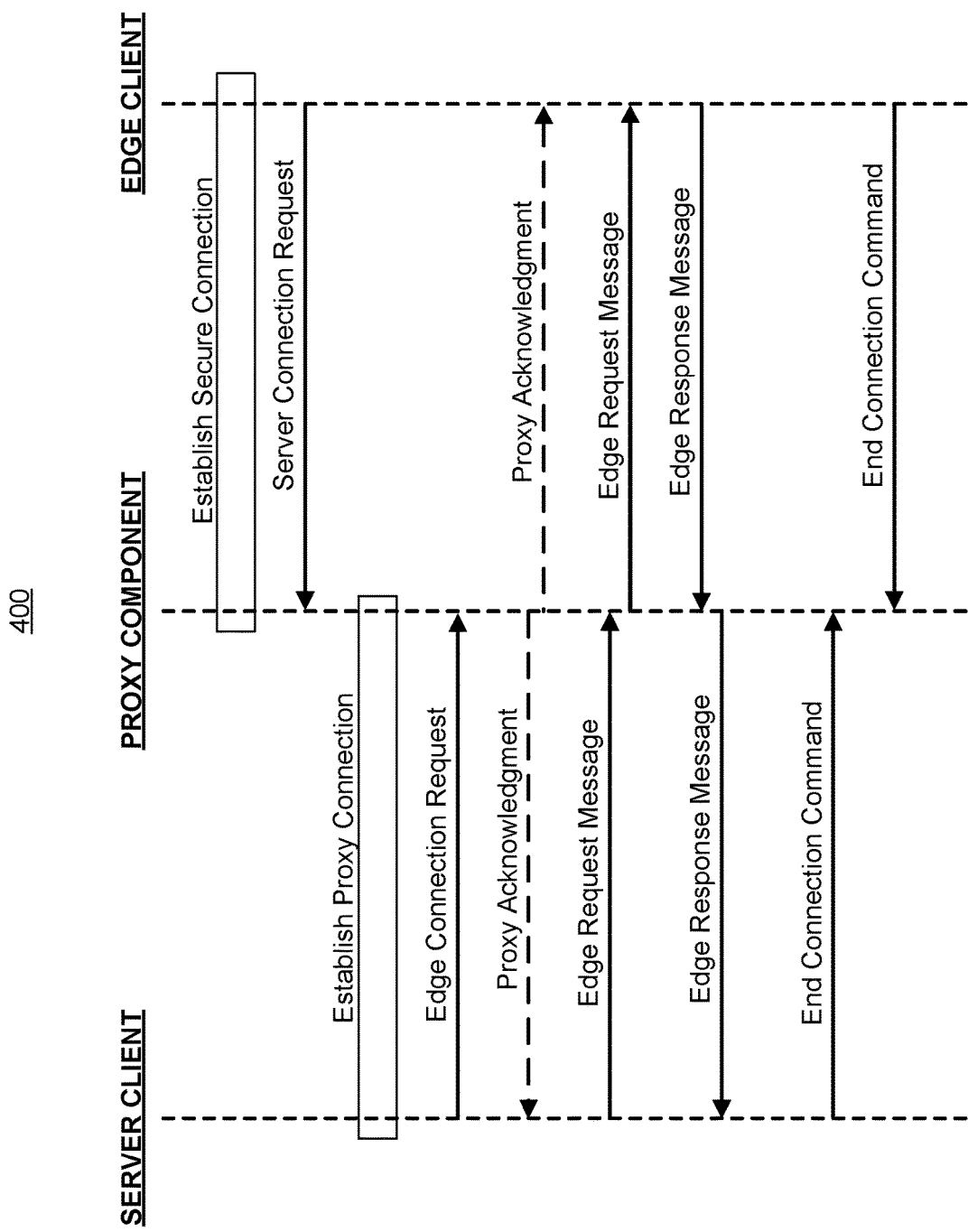
FIG. 4 illustrates an example message flow in accordance with embodiments of the technology disclosed herein.

An example message flow 400 is illustrated in FIG. 4, showing how the connection process can proceed in accordance with embodiments of the technology disclosed herein. The example message flow 400 is provided for illustrative purposes only and should not be interpreted as limiting the scope of the technology to only the depicted example.

As shown in FIG. 4, the edge client and the server client are both configured to pass messages to and from the proxy component to establish a secure connection or a proxy connection, respectively. After the connection is established, the edge client can send a server connection request to the proxy component, requesting that edge client is connected to an identified server client of the management system. The server client can also send an edge connection request to the proxy component, requesting that the server client is connected to an identified edge client. In various embodiments, the managed network name for the edge client, proxy component, and/or server client can be included in the connection requests received by the proxy component. When the proxy component has properly configured the communication path to route data between the server client and the edge client, the proxy component can send an acknowledgement to the edge client and the server client. After receiving acknowledgement, each of the edge client and the server client can communicate between each other through the firewall without the use of a dedicated NAT traversal protocol known in the art. The edge client, the server client, or a combination of both can send requests to the other. As shown in the example of FIG. 4, the server client, after receiving acknowledgement of the connection from the proxy component, sends an edge request message. The edge request message can include data and/or commands for the edge client to perform one or more processes in various embodiments. In other embodiments, the edge client could send a server request message similar to the edge request message. In some embodiments, after the edge request message is sent to and an edge response message is received from the edge client, the connection established between the server client and the edge client can be terminated.

The server client 208 and the proxy component 220 communicate utilizing a server management protocol. Non-limiting examples of server management protocols include different the Redfish protocol and other standard protocols created to enable remote management and monitoring of distributed network devices, such as those published by the Distributed Management Task Force (DMTF). By utilizing one or more standard server management protocols, the technology of the present invention enables NAT traversal without the need for additional, complex traversal protocols, such as STUN, WebRTC, TURN, among others. The server management protocols are generally already utilized by the network devices (e.g., the servers 210, the edge devices 103c) internally to manage the functionality and configuration of the devices in the managed network 100. This reduces the overhead of the firmware required to implement NAT traversal within the managed network 100. The edge client 202 and the server client 208 can both be configured to implement the server management protocol. By configuring the edge client 202 and the server client 208 in this manner, the server 210 and edge device 103c are capable of communicating over the secure communication connection 231 using the server management protocol, bypassing the firewall 105a without publicly advertising the unique managed network name of the edge device 103c.

Figure 3:
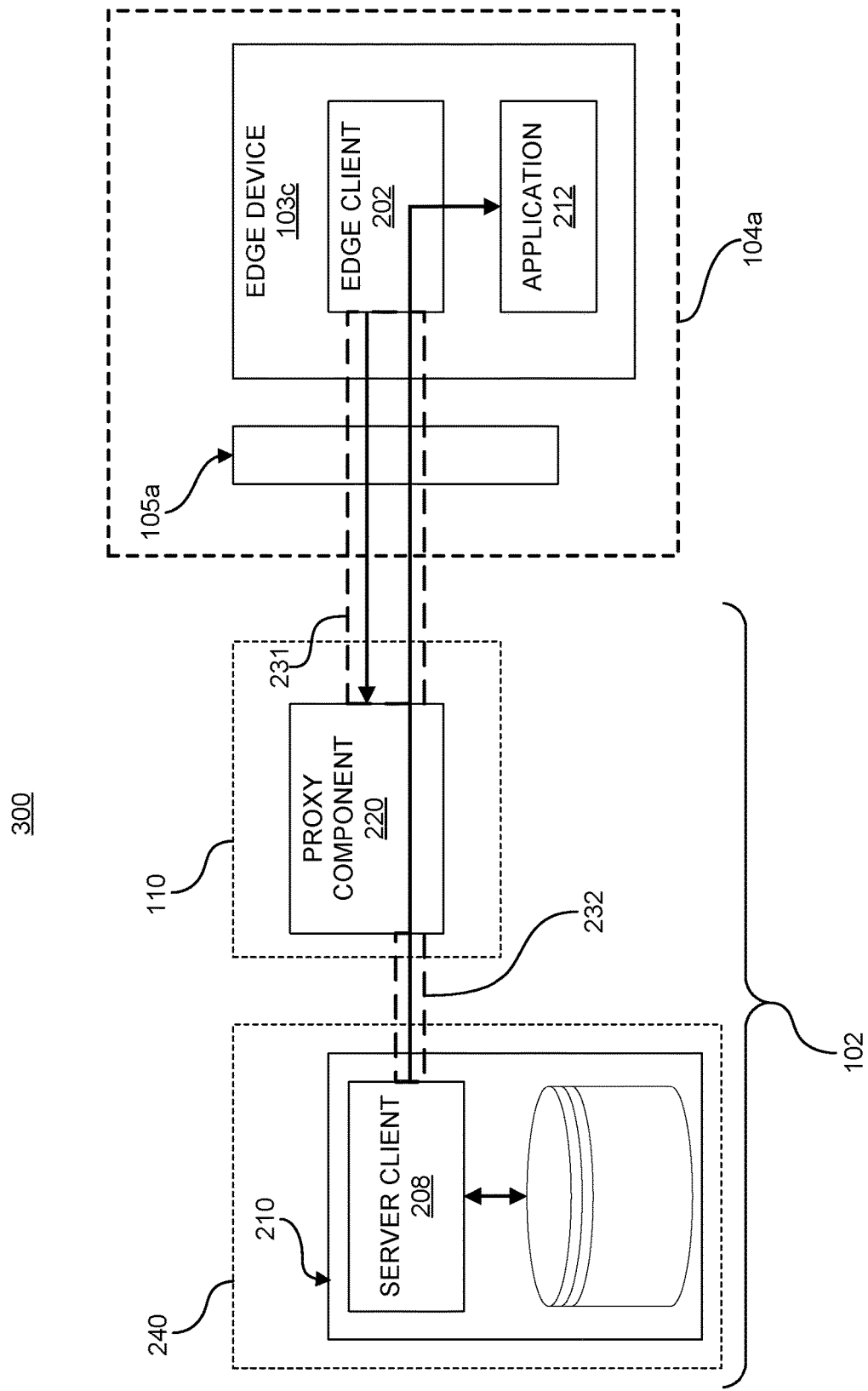
FIG. 3 is a block diagram illustrating another example edge device connection in accordance with embodiments of the technology disclosed herein

As shown in FIG. 1, the edge service networks 104 and the management service 102 can be connected over a public network 110. In various embodiments, the proxy component 220 discussed with respect to FIG. 2 can be disposed within the public network 110. That is, the proxy component 220 can be located outside of the same data center as the servers 210, with the proxy component 220 connected to the servers 210 over the public network 110. FIG. 3 is a block diagram illustrating another example edge device connection 300 in accordance with embodiments of the technology of the present disclosure. As shown in FIG. 3, the proxy component 220 is disposed between the data center 240 and the edge service network 104a, with the proxy component 220 within the public network 110. Although depicted as being disposed within the public network 110, the proxy component 220 can be a private device that is unavailable to devices outside of the managed network 100 discussed with respect to FIG. 1. In such embodiments, the proxy component 220 can connect to the edge device 103c and the server 210 over the public network 110 (e.g., the Internet). The connection process can be the same as that discussed with respect to FIG. 2 and the message flow shown in FIG. 4.

Figure 5:
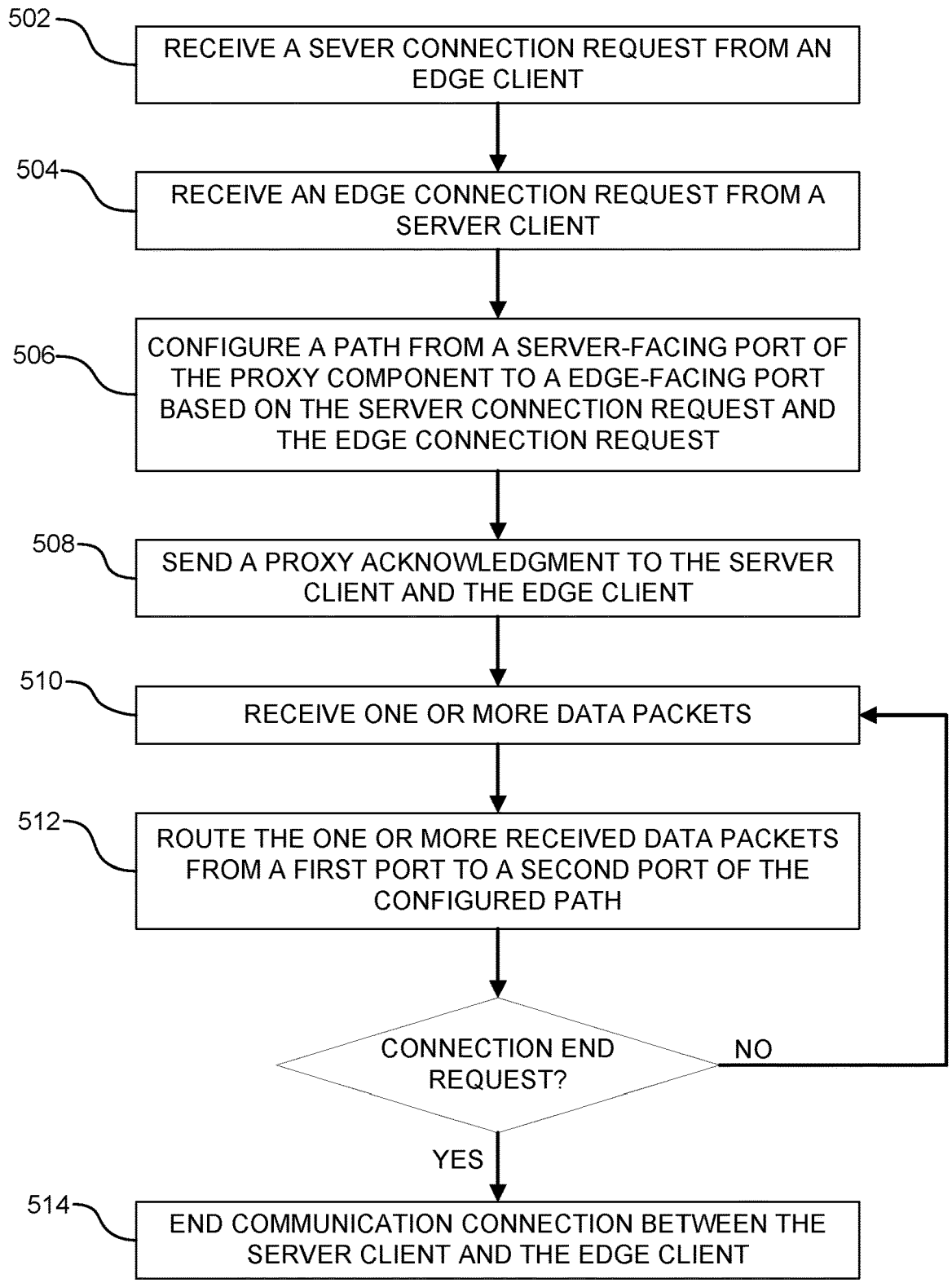
FIG. 5 is an example method in accordance with embodiments of the technology disclosed herein.

FIG. 5 is an example method 500 in accordance with embodiments of the technology disclosed herein. The example method 500 is provided for illustrative purposes only and should not be interpreted as limiting the scope of the technology to only the depicted method 500. The example method 500 can enable NAT traversal utilizing a server management protocol. In various embodiments, the method 500 can be implemented by the proxy component 220 discussed with respect to FIGS. 2 and 3. As shown in FIG. 5, the method 500 can being at operation 502 by receiving a server connection request from an edge client. As discussed with respect to FIGS. 2 and 3, the edge client can send a server connection request to the proxy component. In various embodiments, the server connection request can be part of the establishment of the secure communication connection discussed with respect to FIGS. 2 and 3. In some embodiments, the server connection request can be sent as a TLS connection request. The server connection request can include the unique managed network name for the proxy component such that the edge client can directly connect to a known service location without the need to use an additional, complex NAT traversal protocol such as STUN, TURN, or WebRTC, among others.

At operation 504, the proxy component may also receive an edge connection request from a server client of a server. In some embodiments, a persistent proxy connection between the proxy component and the server client can be established once and remained open. In some embodiments, after receiving the server connection request at operation 502 the proxy component can establish the proxy connection with a server associated with the proxy component. In various embodiments, the edge client and the server client can send data packets in compliance with the server management protocol used in the implementation, with the proxy component facilitate the transmission of the data packets without modification.

At operation 506, the proxy component configures a path from a server-facing port of the proxy component to an edge-facing port of the proxy component based on the server connection request and the edge connection request. The proxy component can identify the intended server and the intended edge device based on the server connection request and the edge connection request, respectively. The proxy component can configure a path such that data received on an edge-facing port associated with the intended edge device is routed to the server-facing port associated with the intended server, and vice versa. Once the path is configured, the proxy component can send a proxy acknowledgment to both the server client and the edge client at operation 508. The acknowledgment message indicates to the edge client and the server client that the path is ready for data packets to be transmitted.

At operation 510, the proxy component can receive one or more data packets. The one or more data packets can be received either from the edge client or the server client. In some embodiments, the one or more data packets can comprise a request from the edge client or the server client, and in some embodiments the one or more data packets can comprise data responsive to a previously received request. In some embodiments, the server connection request and/or the edge connection request can include a request for data or use of resources, and the proxy component can be configured to transmit the server connection request or the edge connection request to its respective recipient in addition to using the connection requests to establish the path for direct communication between the server client and the edge client.

The proxy component can route one or more received data packets can be routed from a first port to a second port of the configured path at operation 512. The first port can be the server-facing port of the proxy component if the received one or more data packets are received over the proxy connection from the server client, whereas the first port can be the edge-facing port of the proxy component if the received one or more data packets are received over the secure communication connection from the edge client. The direction in which the received data packets are routed depends on the proxy component port on which the data packets are received. The received data packets can be received in accordance with the server management protocol implemented in the managed network. As a non-limiting example, the one or more received data packets can comprise one or more Redfish calls. The receiving client (either the edge client or the server client) can be configured to interpret the server management protocol data packets. In some embodiments, the edge client can be configured to route data packets received from the proxy component to one or more applications running on the edge device, similar to the application 212 shown in FIGS. 2 and 3.

In various embodiments, data packets may need to be exchanged several times between the edge client and the server client. The proxy component can be configured to determine whether an end connection request is received. If no end connection request is received, the method 500 can return to operation 510 for receiving one or more additional data packets. If a connection end request is received, the communication connection between the server client and the edge client can be ended at operation 514. In various embodiments, ending the communication connection can comprise ending the route configuration of the proxy component, while in other embodiments ending the communication connection can comprise ending the proxy communication and/or the secure communication connection.

Figure 6:
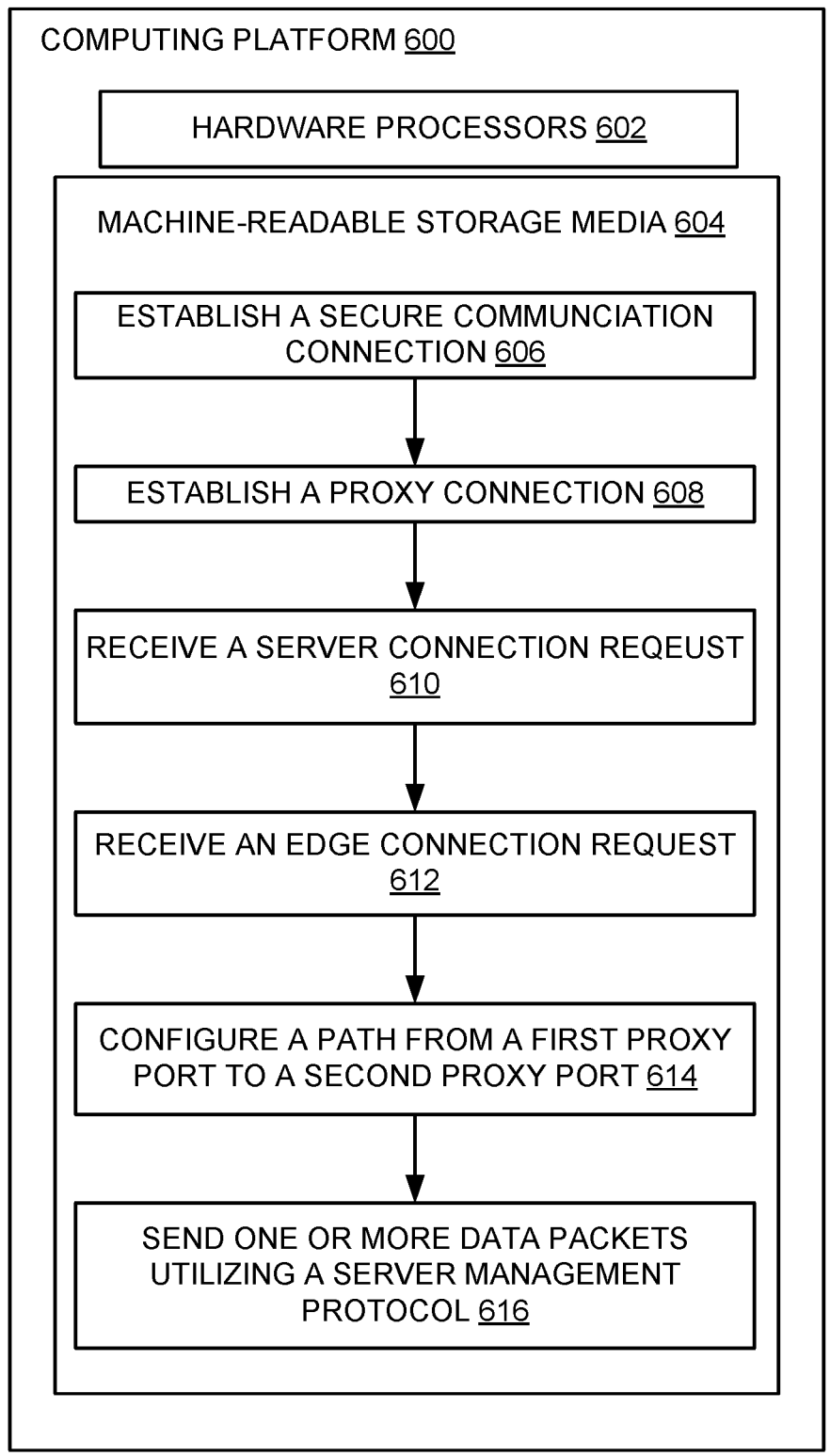
FIG. 6 is an example computing platform in accordance with embodiments of the technology disclosed herein.

FIG. 6 is an example computing platform 600 in accordance with embodiments of the present disclosure. Where operations and functionality of computing platform 600 are similar to those discussed with respect to FIGS. 1-5, the description should be interpreted to apply. In various embodiments, the computing platform 600 may be similar to the proxy component 220, server 210, and/or edge device 103 discussed with respect to FIGS. 1-5. The computing platform 600 includes hardware processors 602. In some embodiments, the hardware processors 602 can comprise one or more processing circuits configured to run a client and/or route data packets between ports of the computing platform 600.

Hardware processors 602 are configured to execute instructions stored on a machine-readable medium 604. Machine-readable medium 604 may be one or more types of non-transitory computer storage mediums. Non-limiting examples include: flash memory, solid state storage devices (SSDs); a storage area network (SAN); removeable memory (e.g., memory stick, CS, SD cards, etc); or internal computer RAM or ROM; among other types of computer storage mediums. In various embodiments, the machine-readable medium 604 can be similar to the non-transitory machine-readable storage medium discussed with respect to FIGS. 1-5. The instructions stored on the machine-readable storage medium 604 may include various sub-instructions for performing the functionality discussed with respect to FIGS. 1-5. For example, the instruction "establish a secure communication connection" 606 may include various sub-instructions for establishing a TLS or other secure connection in a manner similar to that discussed above with respect to FIGS. 1-5. In various embodiments, the instruction 606 can be performed by an edge client of an edge device or a proxy component of a management service. The instruction "establish a proxy connection" 608 may include various sub-instructions for establishing a connection between the proxy component and the server client of a server in a manner similar to those discussed above with respect to FIGS. 1-5. In various embodiments, the instruction 608 can be performed by the proxy component or the server client of a server.

The instruction "receive a server connection request" 610 may include one or more sub-instructions for receiving data packets from an edge client in a manner similar to that discussed above with respect to FIGS. 1-5. In various embodiments, the sub-instructions may further include sub-instructions for communicating using a server management protocol. The instruction "receive an edge connection request" 612 may include one or more sub-instructions for receiving data packets from a server client in a manner similar to that discussed above with respect to FIGS. 1-5. In various embodiments, the instruction 612 may further include sub-instructions for communicating using a server management protocol. The instruction "configure a path from a first proxy port to a second proxy port" 614 may include one or more sub-instructions for configuring a path from a server-facing port to an edge-facing port of the proxy component in a manner similar to that discussed with respect to FIGS. 1-5. The instruction "send one or more data packets utilizing a server management protocol" 616 may include one or more sub-instructions for communicating utilizing a server management protocol in a manner similar to that discussed with respect to FIGS. 1-5.

Figure 7:
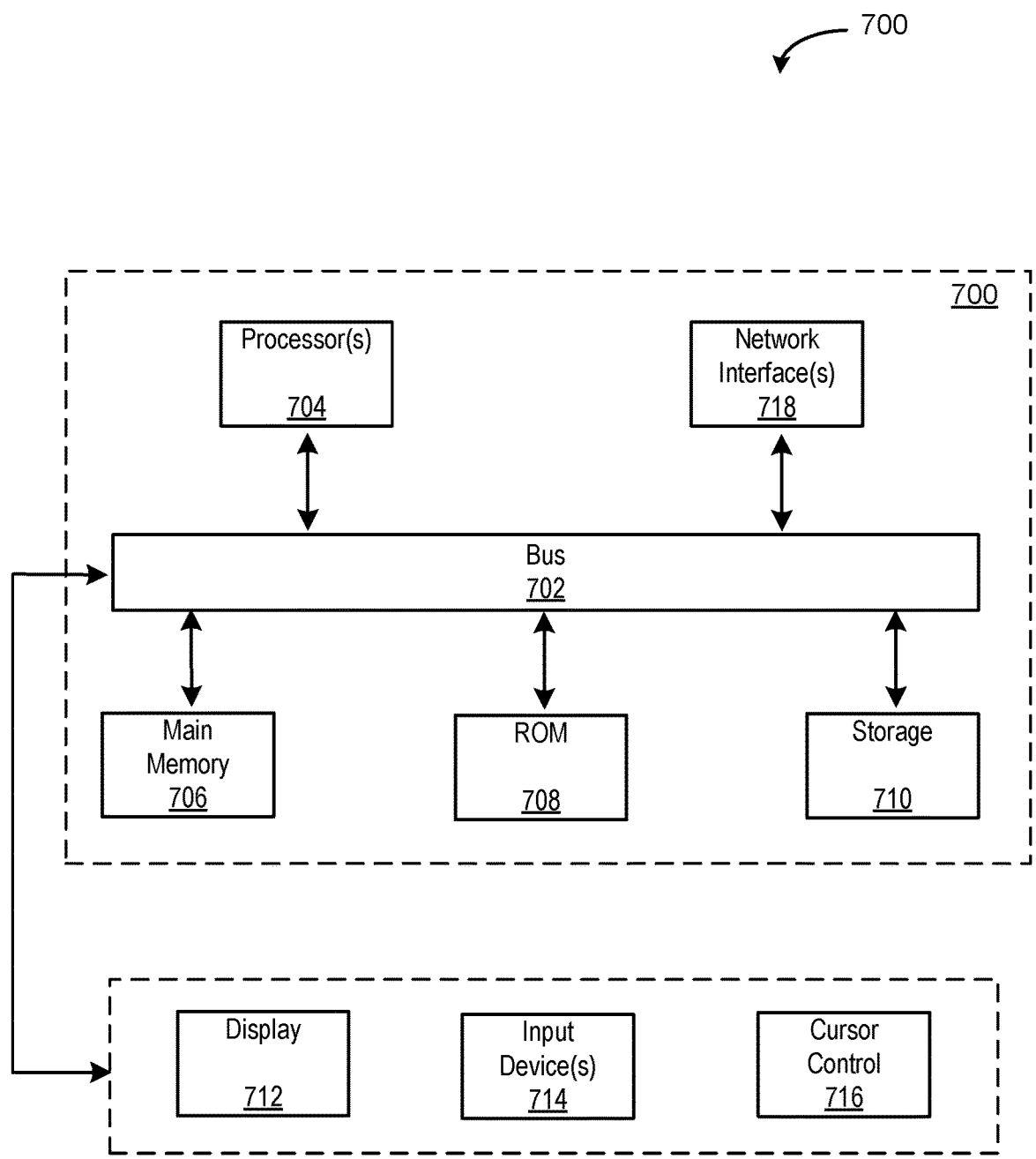
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computer system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    receiving, by a proxy component, a server connection request from an edge client running on one or more edge client devices connected to a public network through a firewall, the request being a request to connect to a requested server client running on one or more network devices connected to the public network and configured to provide a service, the server connection request sent to the proxy component through a firewall;
    identifying, by the proxy component, the requested server client based on the server connection request;
    establishing, by the proxy component, a proxy connection with the requested server client;
    receiving, by the proxy component, one or more data packets from the requested server client; and
    routing, by the proxy component, the one or more data packets to the edge client,
    wherein communication between the edge client and the requested server client is performed using a server management protocol;
    and wherein the proxy component comprises a virtual component running on a same network device as the requested server client, the proxy component communicatively coupled to the server client through a virtual server-facing port and the proxy component communicatively coupled to the edge client through a physical edge-facing port of the network device over the public network.

2. The method of claim 1, wherein the firewall comprises a network address translation (NAT) firewall configured to enable outgoing connections and disable incoming connections.

3. The method of claim 1, wherein the proxy component is co-located with the server client.

4. The method of claim 3, wherein the proxy component and the server client are disposed in a data center.

5. The method of claim 1, further comprising sending, by the proxy component, the server connection request to the server client over the proxy connection.

6. The method of claim 1, further comprising establishing a secure communication connection between the edge client and the proxy component.

7. The method of claim 6, wherein the firewall is configured to enable the secure communication connection between the proxy component and the edge client.

8. The method of claim 1, further comprising receiving, by the proxy component, a data request from the edge client identifying the one or more data packets.

9. The method of claim 1, further comprising:
receiving, by the proxy component, one or more transmitted data packets from the edge client, the one or more transmitted data packets addressed to the server client; and
routing, by the proxy component, the one or more transmitted data packets from the edge client to the server client over a secure communication connection.

10. The method of claim 9, wherein routing the one or more transmitted data packets comprises routing the one or more transmitted data packets received at an edge-facing port of the proxy component to a server-facing port of the proxy component.

11. The method of claim 1, wherein the server client is configured to communicate with a plurality of edge clients over a same proxy connection through a server-facing port of the proxy component.

12. The method of claim 1, wherein the edge client comprises an out-of-band management system.

13. A system comprising:
an edge client running on one or more edge devices of an edge network, the edge network connecting to a public network through a firewall, the one or more edge devices comprising a processor coupled to a non-transitory memory storing processor-executable instructions;
a server client running on one or more network devices at a service hub and connected to the public network, the one or more network devices comprising a processor coupled to a non-transitory memory storing processor-executable instructions; and
a proxy component operatively coupled to the server client,
wherein the edge client and the server client are configured to communicate through the proxy component using a server management protocol configured on both an edge device running the edge client and a server device running the server client;
and wherein the proxy component comprises a virtual component running on a same network device as the server client, the proxy component communicatively coupled to the server client through a virtual server facing port and the proxy component communicatively coupled to the edge client through a physical edge facing port of the network device over the public network.

14. The system of claim 13, wherein the proxy component comprises an intermediate network device communicatively coupled to the one or more customer devices and the one or more network devices over the public network.

15. The system of claim 14, the proxy component communicatively coupled to the server client through a server-facing port of the proxy component over the public network, and the proxy component communicatively coupled to the edge client through an edge-facing port of the proxy component over the public network.

16. The system of claim 13, wherein the firewall comprises a network address translation (NAT) firewall configured to enable outgoing connections from the customer device and disable incoming connections to the customer device.

17. The system of claim 13, wherein the edge client is configured to run on a baseboard management controller (BMC) on the one or more customer devices.

18. A system comprising:
an edge client running on one or more edge devices of an edge network, the edge network connecting to a public network through a firewall, the one or more edge devices comprising a processor coupled to a non-transitory memory storing processor-executable instructions;
a server client running on one or more network devices at a service hub and connected to the public network, the one or more network devices comprising a processor coupled to a non-transitory memory storing processor-executable instructions; and
a proxy component operatively coupled to the server client;
wherein the edge client and the server client are configured to communicate through the proxy component using a server management protocol configured on both an edge device running the edge client and a server device running the server client;
and wherein the server client further comprises a server shim configured to address one or more data packets from the server client to identify an intended edge client recipient through a proxy connection between the server client and the proxy component.

19. A non-transitory machine-readable storage medium storing instructions that, when executed by a processor, cause the processor to:
receive a server connection request from an edge client running on one or more edge client devices connected to a public network through a firewall, the request being a request to connect to a requested server client running on one or more edge client devices connected to a public network through a firewall, the request being a request configured to provide a service, the server connection request sent to the proxy component through a firewall;
establish a secure communication connection between the edge client and the proxy component;
identify the requested server client based on the server connection request;
establish a proxy connection with the requested server client;
receive one or more data packets from the requested server client;
route the one or more data packets from the server client to the edge client;
receive one or more transmitted data packets from the edge client, the one or more transmitted data packets addressed to the server client; and
route the one or more transmitted data packets from the edge client to the server client over a secure communication connection,
wherein communication between the edge client and the requested server client is performed using a server management protocol;
and wherein the proxy component comprises a virtual component running on a same network device as the server client, the proxy component communicatively coupled to the server client through a virtual server facing port and the proxy component communicatively coupled to the edge client through a physical edge facing port of the network device over the public network.

\* \* \* \* \*